United States Patent
Salgado et al.

(10) Patent No.: US 6,885,478 B1
(45) Date of Patent: Apr. 26, 2005

(54) IMAGE TRANSFER DEVICE WITH AUTOMATIC IMAGE ADJUSTMENT

(75) Inventors: David L. Salgado, Victor, NY (US); John W. Daughton, Rochester, NY (US); Susan M. Healy, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/448,005

(22) Filed: Nov. 23, 1999

(51) Int. Cl.$^7$ ................................................. H04N 1/40
(52) U.S. Cl. ....................... 358/449; 358/434; 358/494; 358/451
(58) Field of Search ................................. 358/443, 434, 358/494, 436, 439, 440, 449, 404, 444, 451, 1.9, 3.12, 3.22, 528, 538, 423, 1.2; 395/106; 308/449, 452, 464, 448, 488

(56) References Cited

U.S. PATENT DOCUMENTS

| | | | | |
|---|---|---|---|---|
| 4,394,693 A | * | 7/1983 | Shirley | 358/1.2 |
| 4,876,609 A | * | 10/1989 | Ogura | 358/443 |
| 5,301,036 A | * | 4/1994 | Barrett et al. | 358/448 |
| 5,610,728 A | * | 3/1997 | Sobue | 358/449 |
| 5,907,319 A | * | 5/1999 | Hashimoto et al. | 345/173 |
| 5,930,001 A | * | 7/1999 | Satoh et al. | 358/296 |
| 5,946,527 A | * | 8/1999 | Salgado et al. | 399/82 |
| 5,991,569 A | * | 11/1999 | Sugihara et al. | 399/113 |
| 6,310,984 B1 | * | 10/2001 | Sansom-Wai et al. | 382/289 |
| 6,456,732 B1 | * | 9/2002 | Kimbell et al. | 382/112 |

* cited by examiner

Primary Examiner—Edward Coles
Assistant Examiner—Heather D. Gibbs
(74) Attorney, Agent, or Firm—Perman & Green, LLP

(57) ABSTRACT

A method for transferring an image disposed on a medium with an image transfer device. The method comprises the steps of providing the image transfer device with a controller and a reader, reading the image on the medium with the reader, and forming with the controller a modified image from the image on the medium. The reader is operably connected to the controller for reading the image on the medium. The controller forms the modified image from the image on the medium in response to registering with the controller that the image on the medium is larger than a predetermined size. The modified image formed with the controller is smaller than the predetermined size.

23 Claims, 5 Drawing Sheets

IMAGE TRANSFER DEVICE WITH AUTOMATIC IMAGE ADJUSTMENT

BACKGROUND OF THE INVENTION

1. Field of the Invention

The present invention relates to an image transfer device and, more particularly, to an image transfer device with automatic image adjustment.

2. Prior Art

Image transfer devices are known in the prior art. Examples include multi-function devices such as facsimile machines which may also have the capability of optically scanning an image, printing an image from a PC, or copying an image. Image transfer devices of the prior art generally have limited hardware and software resources, such as for example, limited processing and memory size, in order to reduce the cost of these devices. As a result of the constrain on resources, image transfer devices of the prior art may have performance limitations in regards to the sizes and types of images which may be handled by the devices when performing certain image transfer operations. For example, image transfer devices of the prior art with an image rotation feature, may have limited processing and memory size which prevents rotation of images greater than a given size, or images which include certain types of graphics. When attempting to perform image rotation of these images, the image transfer devices of the prior art merely cancel the operation. However, the consuming public, which expects ever more capable image transfer devices for lower cost, have deemed any performance limitations in image transfer devices as highly undesirable even if brought about in order to reduce the cost of the devices. The present invention overcomes this and other problems of the prior art as will be described in further detail below.

SUMMARY OF THE INVENTION

In accordance with a first method of the present invention, a method for transferring an image disposed on a medium with an image transfer device is provided. The method comprises the steps of providing the image transfer device with a controller and a reader, reading an image on the medium with the reader, and forming with the controller a modified image from the image on the medium. The reader of the image transfer device is operably connected to the controller for reading the image on the medium. The controller modifies the image in response registering, with the controller, that the image on the medium is larger than a predetermined size. The modified image formed by the controller is smaller than the predetermined size.

In accordance with a second method of the present invention, a method for transferring an image on a medium with an image transfer device is provided. The method comprises the steps of providing the image transfer device with a controller, a reader, and image transfer means, reading the image on the medium with the reader, determining if the image on the medium is larger than a predetermined size with the controller, forming with the controller modified image of the image on the medium, and sending the modified image with the controller to the image transfer means for transferring the modified image to the medium. The reader is operably connected to the controller for reading the image on the medium. The image transfer means are operably connected to the controller for transferring the image to the different medium. The controller is programmed to operate the reader and image transfer means to perform a group of user selectable transfer operations. The controller forms the modified image of the image on the medium, if the size of the image on the medium is greater than the predetermined size. The step of determining if the image on the medium is larger than the predetermined size is performed by the controller in response to the user selecting a predetermined transfer operation from the group of transfer operations programmed in the controller.

In accordance with a first embodiment of the present invention, an image transfer device for transferring an image disposed on a medium is provided. The image transfer device comprises a controller, and a reader. The controller is programmed to operate the image transfer device for performing a number of user selectable image transfer operations. The reader is operably connected to the controller for reading the image on the medium. The controller is programmed for determining if the image on the medium is larger than a predetermined size. The controller is further programmed for forming a modified image of the image on the medium if the image on the medium is larger than the predetermined size. The controller determines if the image on the medium is larger than the predetermined size in response to the user selection of a predetermined image transfer operation from the number of user selectable image transfer operations.

In accordance with a second embodiment of the present invention, an image transfer device for transferring an image disposed on a medium is provided. The image transfer device comprises a controller, and a reader. The controller is programmed to operate the image transfer device for performing a number of user selectable image transfer operations. The reader is operably connected to the controller for reading the image on the medium. The controller is programmed for registering a size of the image on the medium. The controller is also programmed for comparing the size of the image with a predetermined image size in response to user selection of a predetermined image transfer operation. The controller has user selectable features available for selection if the size of the image on the medium is larger than the predetermined image size. The selectable features of the controller include at least one of a feature for cropping the image, or a feature for reducing the image.

BRIEF DESCRIPTION OF THE DRAWINGS

The foregoing aspects and other features of the present invention are explained in the following, description, taken in connection with the accompanying drawings, wherein.

DETAILED DESCRIPTION OF THE PREFERRED EMBODIMENT

Figure 1:
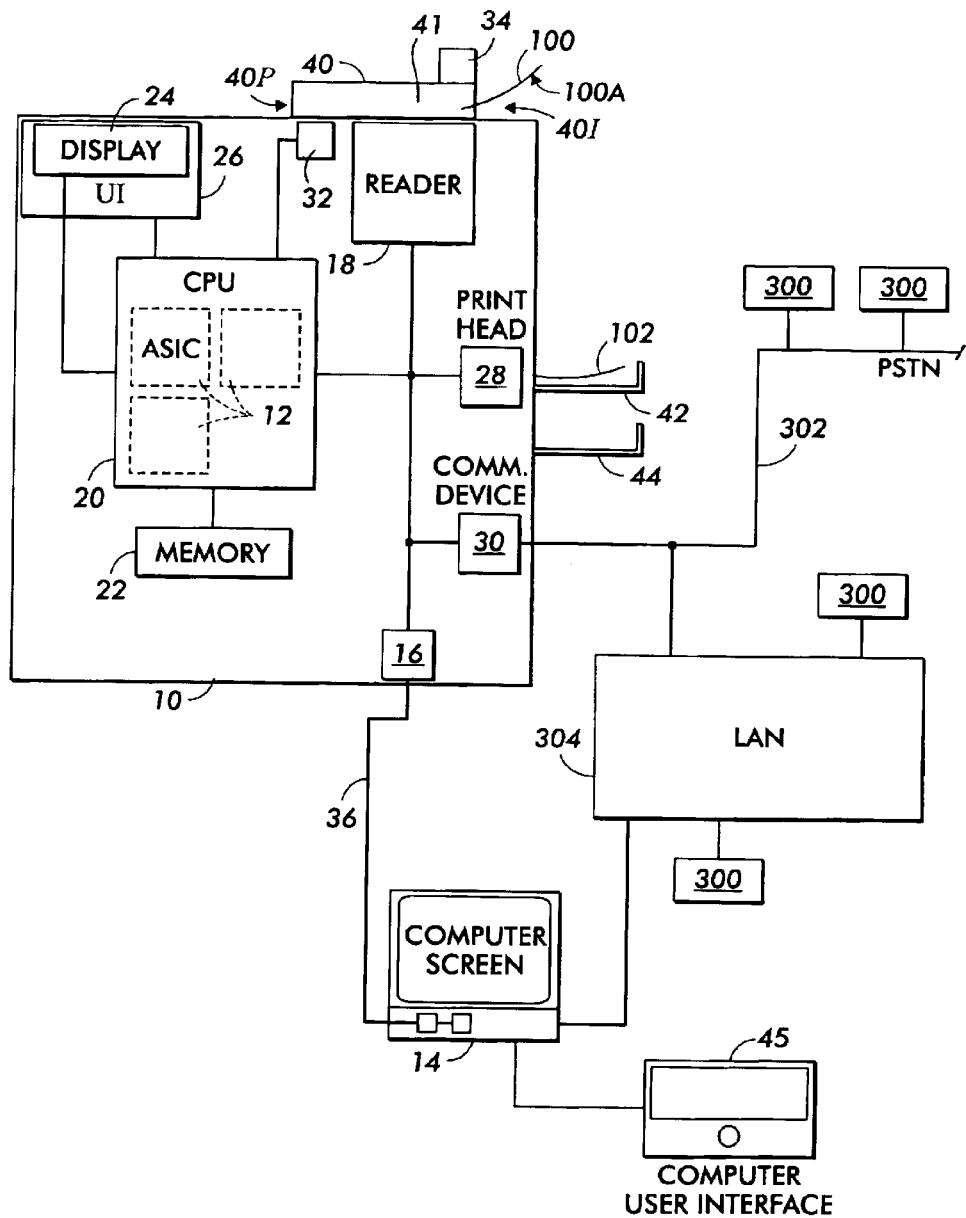
FIG. 1 is a schematic diagram of an image transfer device incorporating features of the present invention.

Referring to FIG. 1, there is shown a schematic diagram of an image transfer device 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

Still referring to FIG. 1, the image transfer device 10 generally comprises a reader 18, a controller or central processing unit (CPU) 20, a memory 22, a display 24 and a user interface (UI) 26. Preferably, the device 10 also includes a print head 28 and a communication device 30. The reader 18 is adapted to read a printed image on medium 100. The print head 28 is adapted to print an image on medium 102. The communication device 30 is adapted to transmit and receive images between the device 10 and one or more image transfer devices 300 located at remote locations. The reader 18, print head 28, and communication device 30 are connected so that the reader 18 can send information to both the print head 28 and the communication device 30. The communication device 30 can also send information to the print head 28. The CPU 20 is connected to the reader 18, the print head 28, and the communication device 30. The CPU 20 is capable of controlling the operation of the reader 18, the print head 28, and the communication device 30 in response to commands from a user. The user enters commands via the user interface 26 which is connected to the CPU 20. The user selects the commands from a menu displayed on the display 24 of the device 10. As seen in FIG. 1, the image transfer device 10 may also include a connector 16 for connecting the device 10, using a suitable cable 36, to a computer 14. The CPU 20, reader 18 or print head 28 of the image transfer device 10 may be connected to the connector 16 to receive and send electronic information to the computer 14. The image transfer device 10 may be connected by a local area network (LAN) 304 to other computers (not shown) and/or other multi-function devices 300. The image transfer device 10 may further communicate with yet other devices 300 using a communication line 302 which may be connected to a public switched telephone network (PSTN) or any other suitable communication network such as a cellular network. The image transferring device 10 may include a computer printer, a copier, a facsimile or an optical scanner capability. In the preferred embodiment, the image transferring device 10 performs as a multi-function device which includes one or more of the aforementioned capabilities. In alternate embodiments the device may have more or less than these four capabilities. When the device 10 is connected to the computer 14, a user may operate the device 10 from the computer terminal to perform one or more of the capabilities of the device 10. Otherwise, the multi-function device 10 is capable of operating as a stand alone device, such as a copier and/or only a facsimile machine. When operating as a copier, the multi-function device 10 may include, for example, image rotation and/or image shift features providing capabilities of repositioning or reconfiguring images during copying operations. The image repositioning and reconfiguring features of the multi-function device 10 of the present invention may be performed even on large images as will be described in greater detail below.

In particular, the reader 18 on the device 10 is preferably an optical scanner capable of reading an image or pattern embodying information which is disposed on sheet medium 100. In the preferred embodiment, the device 10 has a reader input area 40 in which the user places the sheet medium 100 for reading by the reader 18. The input area generally includes a cover 41 for covering a glass platen (not shown) upon which the user places the sheet medium 100 with the image face 100A down. The user may place the sheet medium 100 directly on the glass platen or may use a roller system (not shown) within the cover 41 to feed the sheet medium 100 to the glass platen from an input port 40I. The reader 18 is generally located below the glass platen of the input area 40. The reader 18 is orientated relative to the glass platen to scan the surface 100A of the sheet medium 100 placed against the glass platen. The input area 40 and glass platen of the device 10 are capable of accepting sheet medium having various sizes such as for example, envelopes, 8½×11 sheets, A4 sheets, 11×14 sheets, and larger sheet medium. The sheet medium may be placed in the input port 40I, for automatic feed, or directly on the glass platen in one or more orientations. The input area 40 for the reader 18 of the device 10 has sensors 34 (only one representative sensor is shown in FIG. 1) capable of sensing the size and the orientation of the sheet medium 100 in the input area 40. For example, such sensors may include a series of photo cells (not shown) positioned under the glass platen so that placement of the sheet medium on the platen activates one or more of the cells. The activated cells signal the CPU 20 which is programmed to determine from the number and location of the activated cells the size of the sheet medium 100 on the glass platen. The sensors 34 may also include measuring devices, such as relative displacement transducers located near the intake port 40I of the input area 40, which measure the size of the sheet medium input into the port 40I. Upon introduction of the sheet medium 100 into the input port 40I, the measuring devices 34 may be brought into contact with edges of the medium thereby measuring the size of the medium. The devices 34 send an appropriate signal to the CPU 20 indicating the measured size of the sheet medium 100. Furthermore, the input area 40 of the device 10 of the present invention may include one or more optical sensors 32 (a single representative sensor 32 is shown in FIG. 1) capable of sensing the size of the image disposed on surface 100A of the sheet medium 100, and sending the data to the CPU 20. By way of example, sheet medium which is 11×14 in size may, nevertheless, have a significantly smaller image disposed thereon, such as an image of about 1×1 inches in dimension. Naturally, the maximum size of the image disposed on the sheet medium is limited by the outer dimensions of the sheet medium. The optical sensors 32 may be positioned preferably under the glass platen to view the image on surface 100A of the sheet medium 100 placed against the platen. The optical sensors 32 identify the size of the image, by recognizing contrast or certain patterns, or any other suitable means, and send the size information to the CPU 20. In the preferred embodiment, the reader 18 is a movable reader which operates to optically scan the surface 100A of the sheet medium 100 placed on the glass platen. For example, the reader 18 may travel along the length of the sheet medium 100 while scanning laterally across the face 100A of the sheet medium 100. In alternate embodiments, the device may have a static reader. In that case, a roller system may transport the sheet medium from the input area over the static reader in order for the reader to read the image on the sheet medium. After the reader 18 has finished reading the images on the sheet medium 100, the sheet medium can be removed manually or output by the roller system (not shown) to an output port 40P of the device 10. During operation, the reader 18 converts the printed image on the sheet medium 100 to binary encoded data which can be sent electronically, as directed by the CPU 20 to the print head 28, or the communication device 30. The binary encoded data from the reader 18 may also be sent to the CPU 20, and from the CPU 20 sent to a final location with or without alteration of the data by the CPU. Otherwise, the data from the reader 18 may be stored, at least in part, in the memory 22 of the device 10.

The print head 28 is generally capable of receiving an image in the form of binary data and of printing the image on sheet medium 102. The device 10 has a input area 42 for placing sheet medium 102 prior to printing. An output area 44 holds the sheet medium 102 processed by the print head 28. A sheet medium transport system (not shown), such as a roller system for example, inside the device 10 withdraws sheet medium 102 from the input area 42 and transports the sheet medium 102 to the print head 28. Input area 42 may include several trays (only a single representative tray is shown in FIG. 1). Each of the trays may be dedicated for holding sheet medium of a given size. For example, separate trays may be provided for holding 8½×11 sheets, A4 sheets, and others. The size of the sheet medium in each of the trays may be input, via the user interface 26, or preprogrammed in the CPU 20. The CPU 20 controls the sheet medium transport system to remove the sheet medium from a desired tray in the input area 42. The CPU 20 may select the desired tray in response to an input from the user using the user interface 26. The CPU 20 may also be programmed to automatically select a tray in the input area 42 in response to information from sensors 34 regarding the size of the sheet medium 100 in the reader input area 40 of the device 10. By way of example, the CPU 20 may be programmed to select a tray holding the same size sheet medium as that in the reader input area 40. After the transport system transports the sheet medium 102 from the selected tray in the input area 42 to the print head, the print head 28 prints the image on the sheet medium 102 and the transport system then moves the sheet medium 102 to the output area 44 of the device 10.

The communication device 30 is generally a facsimile transceiver or modem which is coupled to communication line 302 connecting the device 10 to other image transfer devices 300. The communication device 30 is otherwise adapted to receive the binary data of the image read by the reader 18 and generate signals transmitting the image over the communication line 302 to one or more designated image transfer devices 300. The image transfer devices 300 which receive the signals may then reproduce the transmitted image. The communication device 30 can in turn receive images over the communication line 302 from the image transfer devices 300. The communication device 30 demodulates the signals forming the images and then may send the data as directed by the CPU 20 to the print head 28 for printing the images on sheet medium 102.

The CPU 20 is programmed to control the operation of the reader 18, the print head 28 and the communication device 30. The CPU 20 controls the operational sequence of the reader 18, print head 28 and communication device 30 as well as the flow of data therebetween. For example, when the image transfer device 10 is operating in a copier mode, the CPU 20 energizes the reader 18 to read the image on surface 100A of the sheet medium 100. The CPU 20 directs the data from the reader 18 to the print head 28 and queues the print head to print the image read by the reader 18 on sheet medium 102. Concurrent with this, the CPU also operates the transport system transporting the sheet medium 102 from the input area 42 to the print head 28 and then to the output area 44 of the device. When the device 10 is operating in a facsimile sending mode, the CPU 20 operates the communication device 30 to make a connection with selected remote devices 300. The CPU 20 then energizes the reader 18 to read the image on the sheet medium 100 and directs the data to the communication device 30 which sends the data to the remote device 300. In the facsimile standby mode, the CPU 20 operates the communication device 30 to respond to a connection signal from a remote device 300 and form a connection. The CPU 20 may then direct the demodulated image signal received by the communication device 32 to the print head 28 and queue the print head for printing the image on sheet medium 102. The CPU 20 also controls operations of the device 10 when the computer 14 is connected to the device. For instance, when the device 10 is in a scanner mode, the CPU 20 energizes the reader 18 and sends the image data from the reader to the computer. When the device 10 is in a printer mode, the CPU 20 queues the print head for printing and directs image data from the computer 14 to the print head 28.

Figure 2:
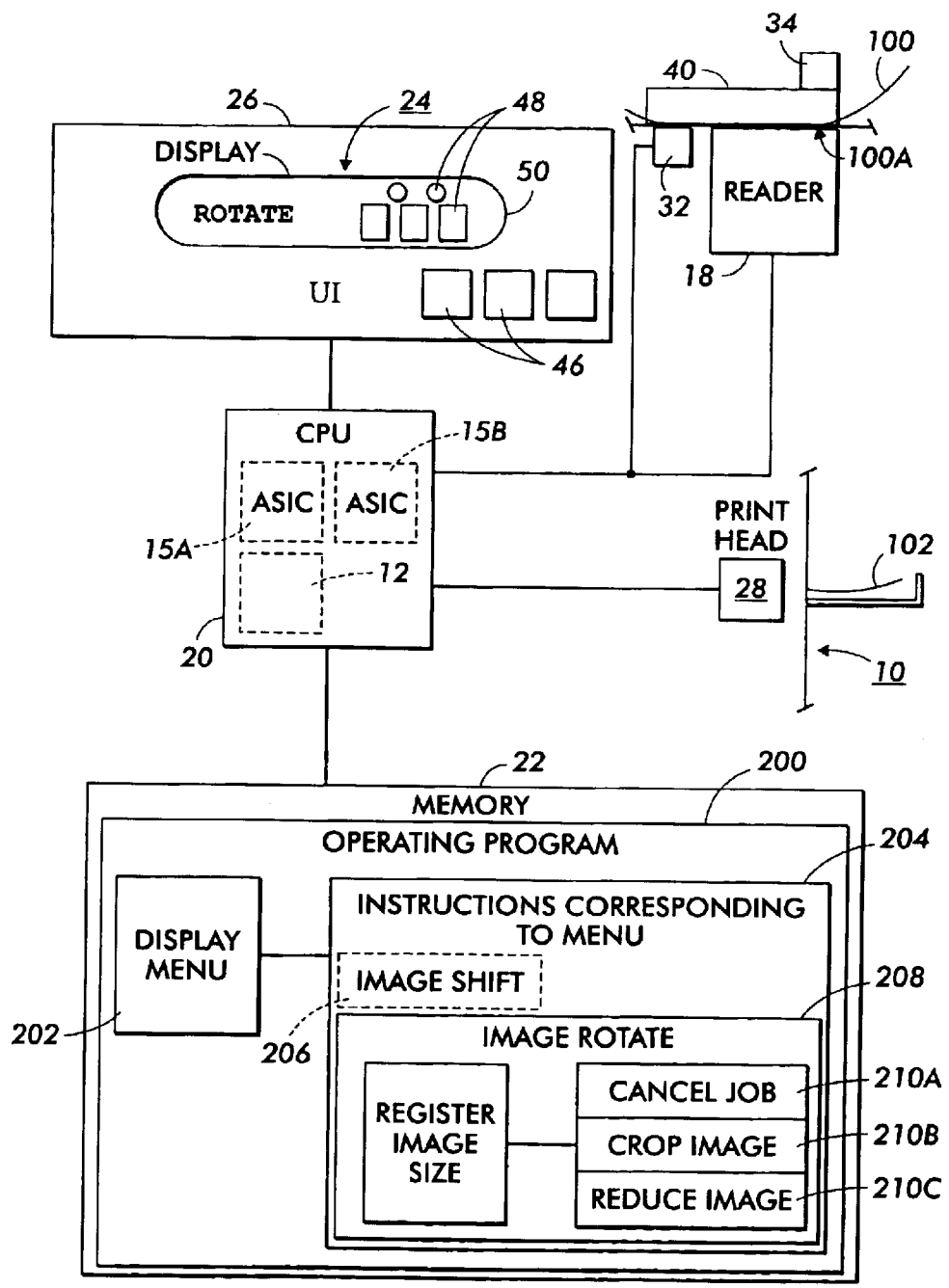
FIG. 2 is a first schematic diagram showing a display, processor, memory, reader, and printing head of the image transfer device in FIG. 1, in accordance with a first preferred embodiment of the present invention.

Referring now also to FIG. 2, the user may operate the image transfer device 10 from the display 24 in the user interface 26 of the device 10. Operation of the display 24 is controlled by the CPU 20. The CPU 20 is programmed to display an operating menu on the display 24 of the transfer device 10. The CPU 20 may also be programmed to display icons or other indicia on the display 24 to indicate various house-keeping functions of the device such as the occurrence of a paper jam or other malfunction for example. The operating menu comprises commands which designate functions of the device 10. The display 24 of the device 10 may include a touch display 50. The operating menu may appear as command buttons 48 disposed on the touch display 50. The user may activate and deactivate, one or more of the command buttons 48 by touching the desired buttons 48 shown on the display 50. The user may also activate or deactivate the command buttons 48 of the operating menu, or otherwise send signals to the CPU 20, by using keys 46 on the user interface 26 of the device 10. The display 50 may be capable of displaying various messages using a alpha-numeric characters as shown in FIG. 2.

The software used by the CPU 20 is stored in the memory 22 of the device 10. In addition to storing the software used by the CPU 20, the memory 22 may also have memory space for storing data sent from the reader 18, the communication device 30, or the computer 14 when the computer is connected to the device 10. In general, the software stored in the memory 22 includes an operating program 200 for operating the image transfer device 10. The basic program is loaded in the CPU 20 when the CPU 20 is initialized. The basic program 200 has a module 202 which defines the operating menu of the image transfer device 10. The basic program 200 also includes a program module 204 which provides instructions to the CPU 20 for controlling the functions of the device 10 corresponding to the commands within the operating menu. The operating menu in module 202 is generally available for display by the CPU 20 on the display 50 of the device 10.

One example of the features of the operating menu of the image transfer device 10 defined by program module 202 are listed in Table 1.

TABLE 1

| I. MODE | | | | |
|---|---|---|---|---|
| 1. COPIER | | | | |
| II. ORIGINAL TYPE | | | | |
| 1. AUTO* | | 2. TEXT | | 3. PHOTO |
| III. MAINTENANCE | | | | |
| 1. CLEAN PRINT HEAD | 2. PRINT TEST PAGE | 3. ALIGN PRINT HEAD | 4. RESET PRINTER | 5. INK LEVELS<br>A. Black<br>B. Cyan<br>C. Magenta<br>D. Yellow |
| IV. PRINT DEMO | | | | |
| V. DEFAULTS | | | | |
| 1. Feature Defaults<br>A. Save new<br>B. Reset | 2. Program Time-out<br>A. 60 sec.*<br>B. 90 sec. | 3. Sleep Mode<br>A. 5 min*<br>B. 10 min | 4. Paper Size<br>A. Letter*<br>B. A4 | 5. Reset Factory |
| VI. LANGUAGE | | | | |
| Language 1 | Language 2 | Language 3 | Language 4 | Language 5 |
| VII. APPLICATIONS | | | | |
| Image Shift | Image Rotate | Border Delete | Application Feature 4 | Application Feature 5 |
| 2. FACSIMILE | | | | |
| II. ORIGINAL TYPE | | | | |
| 1. AUTO* | | 2. TEXT | | 3. PHOTO |
| III. TELEPHONE NUMBERS | | | | |
| NO. 1<br>NO. 5 | NO. 2<br>NO. 6 | NO. 3<br>NO. 7 | NO. 4<br>NO. 8 | |
| V. DEFAULTS | | | | |
| 1. Feature Defaults<br>A. Save new<br>B. Reset | 2. AUTO REDIAL<br>A. 3 min*<br>B. 5 min | 2. Program Time-out<br>A. 60 sec.*<br>B. 90 sec. | 3. Sleep Mode<br>A. 5 min*<br>B. 10 min | 4. Paper Size<br>A. Letter*<br>B. A4 |
| VI. LANGUAGE | | | | |
| Language 1 | Language 2 | Language 3 | Language 4 | Language 5 |
| VII. APPLICATIONS | | | | |
| Application Feature 1 | Application Feature 2 | Application Feature 3 | Application Feature 4 | Application Feature 5 |

*Default Settings

As can be seen from Table 1, in the preferred embodiment, the structure of the operating menu is generally organized to include selection categories which further include one or more selection command options or features. For example, the operating menu in the preferred embodiment includes: selection category I "Mode"; selection category II "Original Type"; selection category III "Maintenance"; selection category IV "Print Demo"; selection category V "Defaults"; selection category VI "Language"; and selection category VII "Applications". The "Mode" selection category includes command options for: 1) "Copier", and 2) "Facsimile" modes which respectively allow the user to select the operating mode of the device 10 as either a copier or facsimile. Selection category II "Original Type" includes: command option 1 "Auto"; command option 2 "Text"; and command option 3 "Photo", which allow the user to input the type of original to be read by the reader. The selection categories III–VI may include command options as shown in Table 1. Selection category VII "Applications" of the operating menu of device 10 may preferably include application features such as "Image Shift", "Image Rotate", "Border Delete", and others. The application features in Selection category VII allow the user to manipulate or modify the image read by the reader 18 from sheet medium 100 so that the image printed by the print head 28 on sheet medium 102 has a different configuration in comparison to the appearance of the image on medium 100. By way of example, the "Image Shift" feature allows the user, operating the device 10 in the "Copier" mode, to read an image on sheet medium 100 and print an image copy on sheet medium 102 wherein the image copy is shifted, or translated, within the reference frame of medium 102 by comparison to the location of the original image on medium 100. Additional sub-menu options (not shown) may be displayed to allow the user to select the direction (e.g. longitudinally or transversely to sheet medium 102) and magnitude in which the image copy printed on sheet medium 102 is shifted in comparison to the original image on medium 100. Otherwise, the CPU 20 may be programmed to have a default setting which automatically determines the direction and magnitude of the shift between image copy on medium 102 and that of the original on medium 100. Similar to the "Image Shift" feature, the "Image Rotate" feature, of selection category VII, allows the user to read an image on sheet medium 100 and print an image copy on sheet medium 102 wherein the image copy is pivoted, or rotated, within the reference frame of medium 102 by comparison to the orientation of the original image within the reference frame of medium 100. Sub-menu options (not shown) which may be displayed on display 24, may allow the user to select the amount of rotation such as 90°, 180°, 270°, and others. The direction of image rotation (i.e. clockwise, counter-clockwise) may be preprogrammed in the CPU 20, or may be selected by the user. Hence, in the case the user selects the "Image Rotate" feature with 90° rotation, and if the original image is generally aligned with the longitudinal axis (not shown) of sheet medium 100, the image copy is printed on sheet medium 102 to be generally aligned with the transverse axis (not shown) of the sheet medium 102. The features of the basic command menu listed in Table 1 are merely examples of the type of features which may be available in the operating menu of the device 10. In alternate embodiments, the operating menu of the image transfer device may include more features or fewer features depending on device characteristics such as available memory space, capabilities of the CPU, and size and type of the display. Preferably, the CPU 20 has sufficient processing capacity and the memory 22 of the device 10 has sufficient size to effect the command features of the operating menu.

The CPU 20 of the device 10 includes processors 12 for performing the features of the operating menu selected by the user. As noted previously, program module 204 contains program instructions corresponding to various operating features in the menu of the device. By way of example, program module 204 may include modules 206 and 208 with program instructions for performing the image shift or image rotation features respectively. When the user selects a given operating feature, by activating the button 48 on display 50, the appropriate program instructions are uploaded from memory 22 to the CPU 20 enabling the processors 12 to perform the desired operations. Deactivation of the buttons 48 on display 50, deletes the instructions from the CPU 20. The CPU 20 preferably includes application specific integrated circuits (ASIC) 15A, 15B. The ASIC 15A, 15B may be used to process the binary encoded data from a reader 18 before sending the data to print head 24. The ASIC 15A, 15B may also be used to process data received from the communication device 30 or the computer 14 (see FIG. 1). The ASIC 15A, 15B are configured to perform data processing in accordance with corresponding features of the operating program. By way of example, the device 10 may have an ASIC 15A for processing the data from reader 18 to provide, at least in part, the image shift feature of the operating menu. The device 10 may further include an ASIC 15B for performing, at least in part, the image rotation feature of the operating menu in Table 1. In alternate embodiments, the CPU of the device may have any other suitable type and number of processors processing data independently or cooperatively to perform the operational features of the menu of the device. The ASIC 15A, 15B may be in a disabled mode initially, and is initialized when the user activates appropriate button 48 on display 50 designating the menu feature to which the ASIC 15A, 15B corresponds. For example, when the user activates the image rotational feature, the CPU 20 enables and initializes ASIC 15B. Activation of the image rotation feature also causes CPU 20 to upload, from memory 22, program module 208. When the user activates the image shift feature, the CPU enables and initializes ASIC 15A, and uploads program module 206.

The CPU 20 operates in accordance with instructions in the respective program module 206, 208 to route the binary encoded data from reader 18 to the corresponding ASIC 15A, 15B. The ASIC 15A, 15B then processes the data embodying the image on sheet medium 100 so that the image generated by the print head on sheet medium 102 from the process data is shifted, or rotated in comparison to the image on sheet medium 100. In the preferred embodiment, the ASIC 15B performing image rotation has a processing capability allowing rotation of an image on medium 100 of up to about 118,300 mm$^2$ (or about 183.4 inches$^2$). In alternate embodiments, the ASIC for rotating an image or for performing other features of the device may have a processing capability which can process digital images larger or smaller in size as desired. In the present invention, program module 208 may be uploaded by CPU 20 when the user selects the image rotation feature of the menu (see Table 1). Program module 208 programs the CPU to register the size of the image and determine if the image on sheet medium 100 has a size which exceeds the processing capability of the ASIC 15B. As noted previously, the size of the image on sheet medium 100 in the input area 40 of the reader 18, may be sensed with optical sensors 32 which send a suitable signal to the CPU 20 indicating the size of the image. By using sensor 32, the CPU 20 may register whether the image on sheet medium 100 is greater than the processing capability of the ASIC 15B before the reader 18 reads the image. In alternate embodiments, the CPU of the device may be programmed to register the size of the image on the sheet medium by sampling data from the reader to identify the locations on the medium where the readers is not longer optically scanning an image. In other alternate embodiments, the CPU may be programmed to register the size of the image on the sheet medium read by the reader by any other suitable means.

In the case where, the image on sheet medium 100 has a size within the processing capability of the ASIC 15B, the CPU 20 may generate a digital image from the data sent by the reader 18 optically scanning the image on sheet medium 100. For example, the digital image generated by CPU 20 may be a bit map, or a scalable graphics array or map. The digital representation of the image may be sent to the ASCI 15B. The ASIC 15B may operate to reconfigure the digital image, whereby the digital image is rotated in accordance with the amount of indicated by the user. The reconfigured digital image may be transmitted from ASIC 15B in suitable electronic format, to the print head 28 which prints the rotated image on sheet medium 102.

As seen in FIG. 2, in the preferred embodiment the program module 208 in memory 22 includes modules 210A–210C. Modules 210A–210C of program 208 are enabled by CPU 20 in response to the CPU registering that the image on sheet medium 100 has a size which exceeds the processing capability of the ASIC 15B (e.g. greater than 183.4 inches$^2$). The CPU 20 of the device 10 preferably displays on display 24, menu features or options corresponding to program modules 210A–210C. The CPU 20 may display the menu options automatically upon registering that the image on sheet medium 100 is larger than the processing capability of the ASIC. The CPU 20 does not display the menu options corresponding to program modules 210A–210C when the CPU registers that the size of the image on sheet medium 100 is less than or equal to the processing capability of the ASIC 15B. One example of the added menu options displayed by CPU 20, in response to registering that the image on sheet medium 100 is too large to be rotated with ASIC 15B are listed in Table 2.

TABLE 2

| 1. Cancel Job | | | |
|---|---|---|---|
| 2. Crop Image | a. Center Crop | b. Head/ Foot Crop | c. Side Crop |
| 3. Reduce Image | a. Isotropic | b. Anamorphic | |

As seen in Table 2, in the preferred embodiment, the CPU 20 displays three menu features. The menu features shown in Table 2 are an example of the type and number of menu options which may be displayed by the CPU 20 of the device 10 in response to registering that the image on sheet medium 100 exceeds the capability of ASIC 15B of rotating the digital form of the image. In alternate embodiments, the menu displayed by the CPU in response to registering that the image on medium 100 exceeds the processing capability of the corresponding ASIC 15B may include any suitable features. As indicated by its heading, the "Cancel Job" feature of the menu in Table 2 allows the user to cancel the "(Image Rotation)" feature selected by the user from the menu options shown in Table 1. The "Crop Image" feature of the menu in Table 2 allows the users to digitally crop the image read by reader 18, thereby forming a cropped digital image which is within the image size that may be rotated by ASIC 15B. The "Crop Image" feature preferably may include sub-features such as a. "Center Crop", b. "Head/ Foot Crop", and c. "Side. Crop", though any other suitable sub-features may be included which allows the user to designate the areas where the image from medium 100 is to be digitally cropped. For example, the "Center Crop" sub-feature, in Table 2, provides that an equivalent area from each border of the image is to be digitally cropped. The "Head/Foot Crop" sub-feature designates that the image is digitally cropped at the top and bottom. The "Side Crop" designates that digital cropping is performed at the left and right sides of the image. In alternate embodiments, additional sub-features may be provided which may designated as to which sides or borders of the image are to be digitally cropped. The "Reduce Image" feature of the menu in Table 2 allows the user to digitally reduce the image on sheet medium 100 read by reader 18, thereby forming a reduced digital image which is within the image size that may be rotated by ASIC 15B. As shown in Table 2, the "Reduce Image" feature preferably may include sub-features such as a. "Isotropic" reduction, and b. "Anamorphic" reduction which allow the user to specify the form in which image reduction is to be performed. The "Isotropic" reduction feature causes the image is to be reduced uniformly in all directions during the reduction process. The "Anamorphic" reduction feature causes the image to be reduced different amounts in different directions. By way of example, during "Anamorphic" reduction the image may be digitally reduced longitudinally to a greater extent than laterally. In alternate embodiments, the sub-features included with the "Reduce Image" feature may specify reduction amounts in given directions.

The menu features and sub-features listed in Table 2, may be displayed as buttons or keys 48 on touch display 50 of the user interface 26 (see FIG. 1). Hence, the features and sub-features listed in Table 2 may be activated or deactivated by the user touching appropriate buttons 48 on display 50. In alternate embodiments, these features may be activated and deactivated by any other suitable user interface means. Activation of a feature causes the CPU 20 to access the program instructions in program modules 210A–210C corresponding to the activated feature in order to carry out the operations associated with that feature. The "Cancel Job" feature of the menu in Table 2 corresponds to module 210A, the "Crop Image" feature corresponds to module 210B, and the "Reduce Image" feature corresponds to module 210C of program 208 in memory 22. By way of example, in the case the "Cancel Job" feature is activated, the CPU 20 accesses program module 210A. In accordance with the programming in module 210A, the CPU 20 proceeds to exit the "Image Rotation" program of module 208. The CPU 20 may also change the display 24 to delete the menu features shown in Table 2, and display the features of the menu in Table 1. Also, if desired, the CPU 20 may reset the reader 18, the print head 24, communication device 30, and any other parts of the device 10 to proceed with the next task. In the case the "Crop Image" feature is activated, the CPU 20 accesses program module 210B. The CPU 20 may generate a digital image from the image on medium 100 read by reader 18. The CPU 20 may generate the digital image by, for example, forming a bit map or scalable graphics map or array from the data sent by reader 18 reading the image. The CPU 20 crops the digital image according to sub-features selected by the user. For example, if "Center Crop" is selected, the CPU 20 electronically removes portions of the digital image, such as by deleting sections of the bit map, which portions represent borders of the image on the medium 100. If "Head/Foot Crop" or "Side Crop" are selected, the CPU 20 electronically removes portions of the digital image which represent respective regions at the head/foot, or at the sides of the image on sheet medium 100. In all cases, the CPU 20 automatically determines the size of the portions to be cropped from the digital image so that the resulting cropped digital image is capable of being rotated by ASIC 15B. In the case "Reduce Image" is activated by the user, the CPU 20 accesses program module 210C. The CPU 20 may generate a digital image from the image on medium 100 by forming a bit map or scalable graphics map from the data sent by the reader 18. The CPU 20 electronically reduces the digital image isotropically or anamorphically as indicated by the user. The CPU 20 automatically determines the amount of image reduction, whether isotropic or anamorphic, so that the reduced digital image is capable of being rotated by the ASIC 15B.

Figure 3:
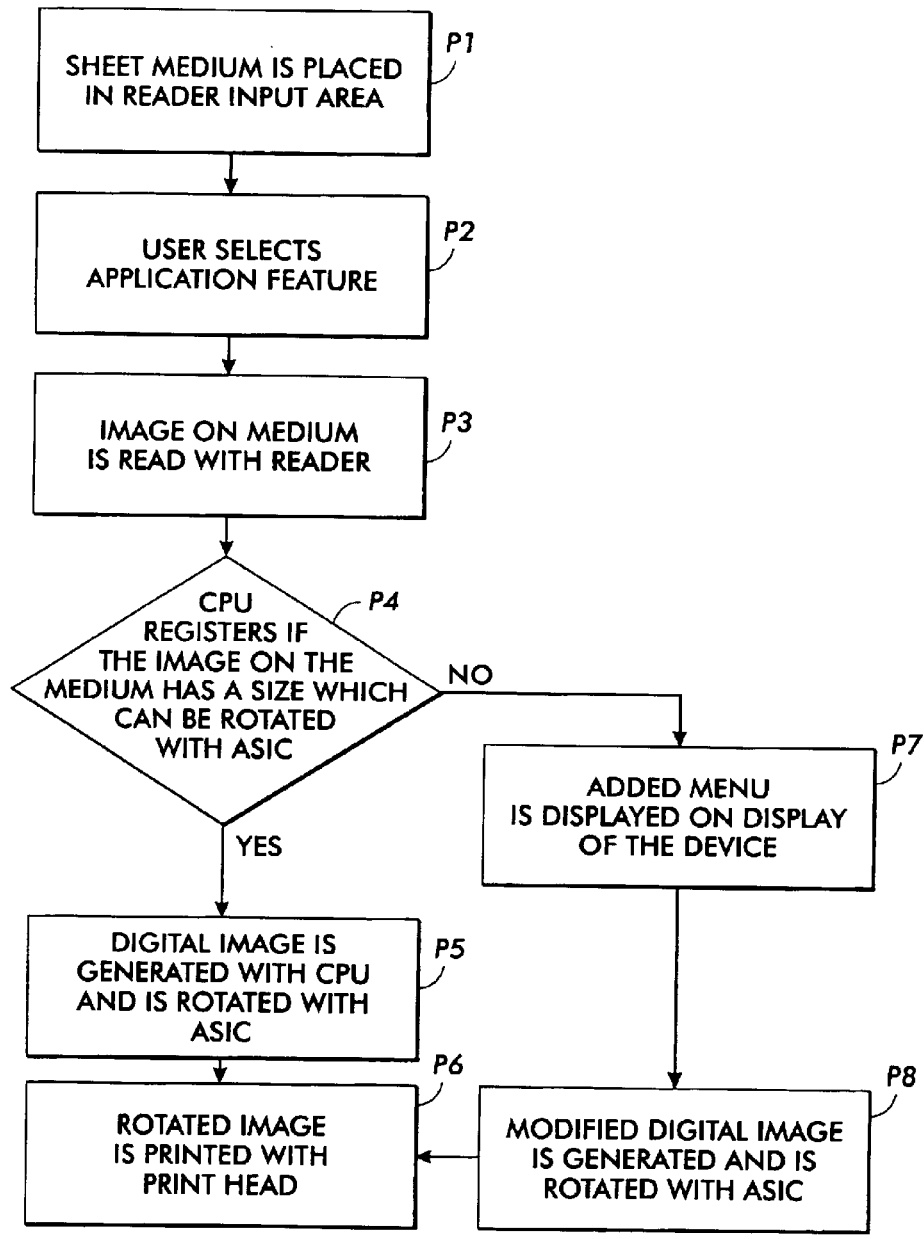
FIG. 3 is a flow chart graphically depicting a first method for transferring an image disposed on a medium in accordance with the present invention.

Referring now to FIG. 3, there is shown a flow chart graphically depicting a method for transferring an image from sheet medium 100 to sheet medium 102, which method is described below. In block P1, the user places sheet medium 100 having an image disposed on surface 100A in the input area 40 of the device (see also FIGS. 1 and 2). The user places the sheet medium with the surface 100A down against the glass platen to allow reader 18 to read the image. In block P2, the user selects the desired features from the menu shown in Table 1, displayed on the display 24 of the device 10. In block P3, the CPU 20 operates the reader 18 to optically scan the image on sheet medium 100. In addition, if in Block P2 the user selects "Image Rotation", in Block P4, the CPU 20 registers if the image on sheet medium 100 exceeds the digital image size capable of being rotated by ASIC 15B as described previously.

The steps identified in blocks P3 and P4 may be performed in any order. For example, the CPU 20 may register the size of the image on sheet medium 100 before, substantially simultaneously with, or after the reader 18 scans the image on the sheet medium. If, in block P4, the CPU 20 registers that the image on sheet medium 100 has a size allowing the ASIC 15B to rotate the image in digital form, the CPU 20 in block P5, generates a digital representation of the image on sheet medium 100 and using the ASIC 15B rotates the image. If in block P4 of FIG. 3, the CPU 20 registers that the image on sheet medium 100 exceeds the capability of the ASIC 15B, the CPU 20, in block P7, automatically displays the menu features of Table 2 on display 24 of the device 10. FIG. 3, reflects the case wherein the user selects either the "Crop Image" or "Reduce Image" features of Table 2. Hence, in block P8, the CPU 20 generates a modified digital image from the image on sheet medium 100 which is capable of being rotated by ASIC 15B. The user, may however select to cancel the job, in which case the procedure depicted in FIG. 3 would end with block P7. As noted previously, the CPU 20 generates the modified digital image by cropping or reducing a digital representation of the image on sheet medium 100. The CPU 20 automatically determines the amount of cropping or reducing to be used so that the modified digital image may be rotated by ASIC 15B. After generating the modified digital image, the CPU 20 uses ASIC 15B to rotate the modified image. In block P6 of FIG. 3, the CPU 20 routes the rotated digital image to the print head 28 which prints the rotated image on sheet medium 102.

Figure 4:
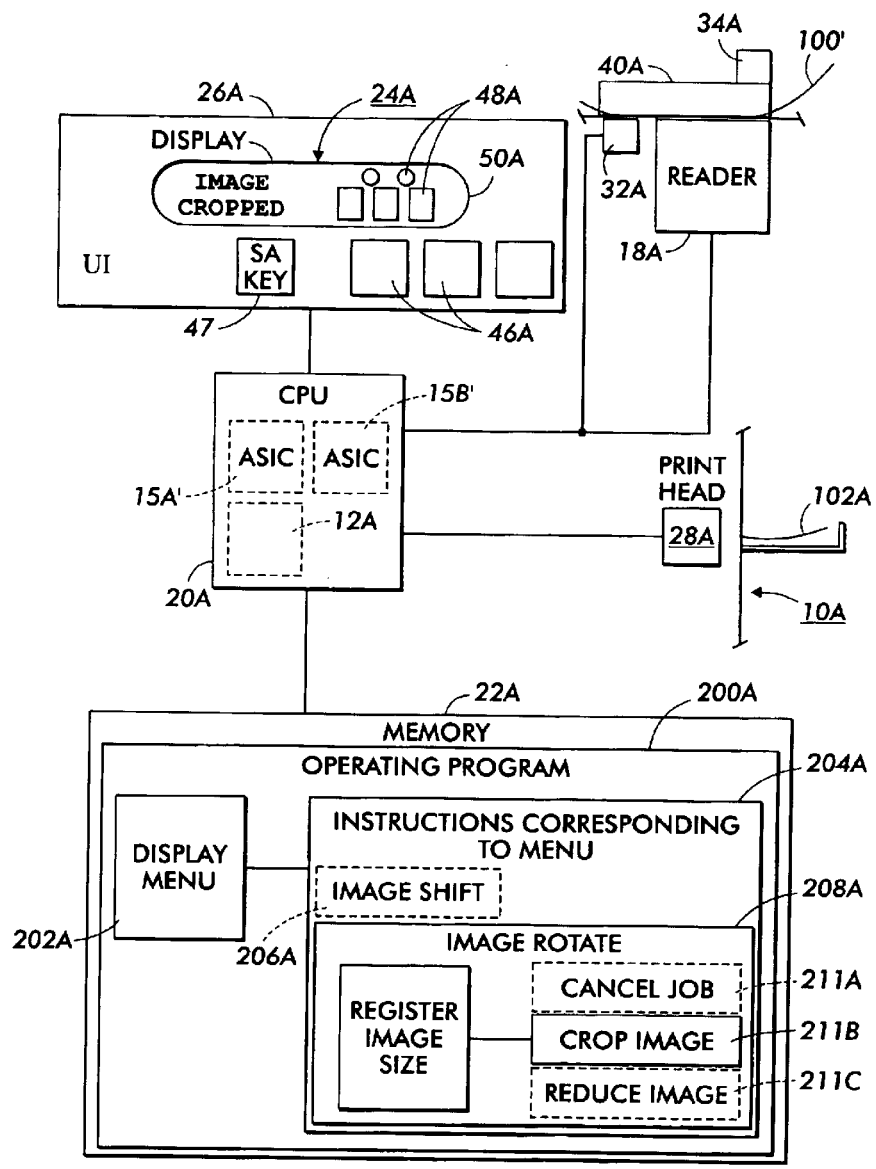
FIG. 4 is a second schematic diagram showing the display, processor, memory, reader, and printing head of an image transfer device in accordance with a second preferred embodiment of the present invention.

Referring now to FIG. 4, there is shown a schematic diagram of an image transfer device 10A in accordance with a second preferred embodiment of the present in invention. Except as indicated below, the image transfer device 10A of the embodiment shown in FIG. 4 is substantially similar to the device 10 shown in FIGS. 1 and 2 and described above. Accordingly, similar features in FIG. 4 have similar reference numerals as features shown in FIGS. 1 and 2. The image transfer device 10A has a special access button or key (SAK) 47. In the preferred embodiment, the SAK 47 is located on the user interface 26A, though the SAK maybe placed in any other suitable location. Preferably, the SAK 47 may be activated by a special access key operator (SA/KO). Users of the device 10 generally cannot access or activate the SAK 47. Correspondingly, the SAK 47 preferably has a suitable locking device (not shown), such as for example, an electronic, or electromechanical lock, which when locked prevents users from activating the SAK 47. The lock of the SAK may be unlocked by the SA/KO using a suitable device for interfacing with and unlocking the SAK lock such as, an electronic or electromechanical key. The SAK 47 communicates with the CPU 20A to send appropriate signals to the CPU when the SAK 47 is activated, which allows the SA/KO to perform special operations otherwise not available to typical users of the device 10. By way of example, in response to activation of the SAK, the CPU 20A may display, on display 24A, a special menu (not shown) containing one or more operating features which are otherwise not available for display. Such features may allow the SA/KO to access and change some of the program instructions, or structures of programs saved in memory 22A as will be described in greater detail below. In the alternative, the CPU of the device may be programmed to perform one or more operations, such as changing a setting or enabling/disabling a feature of the device, in response to receiving an activation signal from the SAK. In still other alternate embodiments, in lieu of using the SAK, the SA/KO may enter a special access code, such as an alphanumeric sequence, using an alphanumeric keypad of the user interface or a remote communication device in order to command the CPU to perform desired special operations.

The operating menu displayed by CPU 20A on display 24A, which allow users to operate the image transfer device 10A in FIG. 4, may be substantially the same as the menu in Table 1. As noted previously, users may select desired menu features using buttons 48A on touch display 50A or keys 46A, of the user interface 26A. The memory 22A of the device 10A may include an operating program 200A with module 204A holding instructions corresponding to the available features in the menu. Program module 204A preferably includes, amongst others, modules 206A corresponding to the "Image Shift" feature, and module 208A corresponding to the "Image Rotate" feature in Table 1. The CPU 20A may include processors 12A and ASIC 15A', 15B' which, in response to selection of a feature, operate on the data from the reader 18A reading the image on sheet medium 100' in accordance with the instructions from the corresponding program modules. For example, upon user selection of the "Image Rotate" feature of the operating menu, the CPU 20A uploads module 208A from memory 22A. In accordance with program instructions in module 208A, the CPU 20A, preferably using signals from sensors 32A, and 34A, automatically registers if the image on sheet medium 100' in input area 40A is too large to be rotated by ASIC 15B'. In the case, the image on sheet 100' has a size which can be rotated by ASIC 15B' when the image is digitized, the CPU 20A is programmed to operate the reader 18A to read the image, and rotate the digital form of the image using ASIC 15B' before sending the data embodying the rotated image to printhead 28A for printing the rotated image on sheet medium 102A.

As seen in FIG. 4, program module 208A preferably includes modules 211A–211C with instructions for CPU 20A in the case the image on medium 100' is too large to be rotated with ASIC 15B'. In this embodiment, modules 211A–211C have enable and disable modes. When a module 211A–211C is enabled, the CPU 20A may access the module. The disabled modules can not be accessed by the CPU 20A. FIG. 4 shows module 211B for cropping the image in an enabled mode, and modules 211A and 211C respectively for canceling the job, and for reducing the image in a disabled mode. Modules 211A–211C may have a default setting (i.e. either enabled, or disabled) set during fabrication of the device 10. The enabled/disabled setting of modules 211A–211C may be changed by the SA/KO using the SAK 47 at a desired time. By way of example, the default setting of modules 211A–211C may have the "Cancel Job" module 211A enabled, and modules 211B "Crop Image", and module 211C "Reduce Image" disabled. The SA/KO, when desired, may activate the SAK 47 and using CPU 20 may disable the "Cancel Job" module 211A, and enable the "Crop Image" modules 211B as is shown in FIG. 4. The SA/KO may further enable a particular portion of the "Crop Image" module 211B, thereby to specify that the cropping operation is to be performed by center cropping, head/foot cropping, or side cropping. In a similar manner, the SA/KO may also disable the "Crop Image" module 211B, and enable the "Reduce Image" module 211C, and further specify whether the reduction shall be isotropic or anamorphic. Preferably, the SA/KO configures the settings such that one module from all the modules 211A–211C is enabled. The CPU 20A is programmed to automatically access the enabled module 211A–211C in response to registering that the image on sheet medium 100' is too large to be rotated with ASIC 15B'. By way of example, in the case the "Crop Image" module 211B is enabled, as shown in FIG. 4, the CPU 20A in response to registering that the image on sheet medium 100' is too large to be rotated with ASIC 15B, automatically accesses module 211B and electronically crops the digital form of the image in accordance with program instructions in module 211B without input from the user. In the case the "Reduce Image" 211C, is enabled, the CPU 20A in response to registering that the image on sheet medium 100' is too large to rotate, automatically accesses module 211C and electronically rotates the digital form of the image in accordance with instructions in module 211C without input from the user. Furthermore, the SA/KO may be able to modify the instructions in program module 208A in order to set the size to which the digital image is cropped or reduced by the CPU 20A. For example, the SA/KO may set the size of the cropped or reduced digital image generated by CPU 20A to be somewhat smaller than the maximum digital image size capable of being rotated by ASIC 15B.

Figure 5:
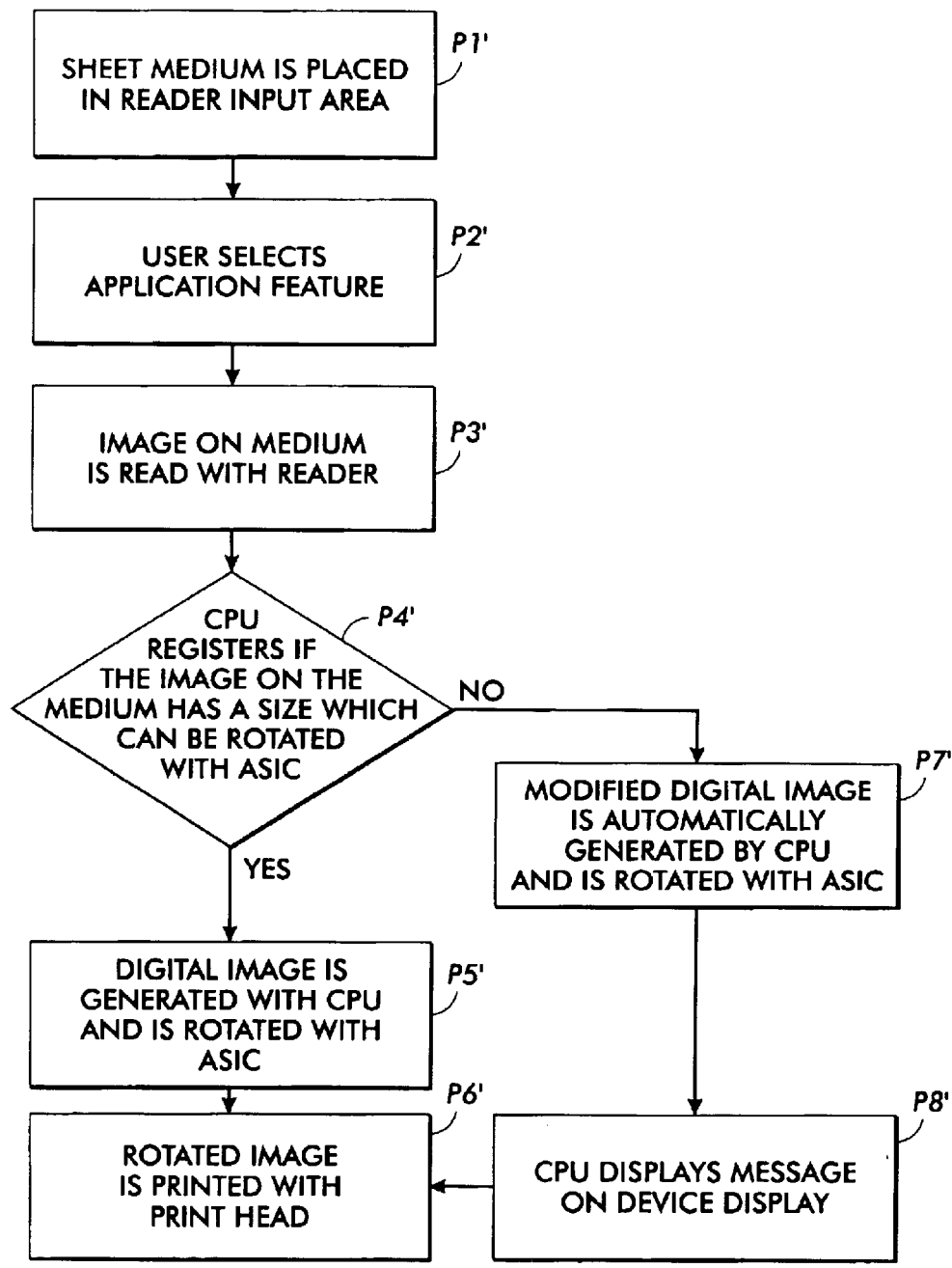
FIG. 5 is a flow chart graphically depicting a second method for transferring an image disposed on a medium in accordance with the present invention.

Referring now to FIG. 5, there is shown a flow chart graphically depicting a method for transferring an image disposed on a medium 100' in accordance with the second preferred embodiment of the present invention as described below. This method is similar to that shown in FIG. 3 except as otherwise noted below. In block P1' of FIG. 5, the user places sheet medium 100' in the input area 40A of device 10A. In block P2', the user selects the desired menu features (e.g. "Rotate Image"), and in block P3' the CPU 20A operates the reader 18A to scan the image on the medium 100'. In block P4' of FIG. 5, the CPU 20 registers the size of the image. If the CPU 20 registers that image on sheet medium 100 has a size allowing the ASIC 15B to rotate the image in digital form, the CPU 20 in block P5', generates a digital representation of the image on sheet medium 100 and using the ASIC 15B rotates the image. If the CPU registers that the image on the medium is too large, then in block P6' the CPU 20 automatically accesses the enabled program module 211A–211C, and automatically modifies (i.e. crops or reduces) the digital image of the image on medium 100' to generate a modified digital image of a size capable of being rotated by ASIC 15B'. FIG. 5 reflects the case where either module 211B "Crop Image", or module 211C "Reduce Image" are enabled by the SA/KO. In the case module 211A is enabled by the SA/KO, the CPU 20 cancels the job and proceeds to the next task. After generating the modified digital image, the CPU 20A uses ASIC 15B' to rotate the modified image. In Block P8', the CPU 20A automatically displays a warning message on the display 24A of the device 10A indicating to the user that the original image has been modified before rotation. For example, in the case the digital image is cropped in block P7', the CPU 20A in block P8' may display a message on display 24A such as "Image Cropped". If the digital image was reduced in block P7', then the message displayed by the CPU 20A in block P8' may be "Image Reduced". In alternate embodiments, the CPU 20 may be programmed to display the appropriate error message on the job's error sheet printed upon completion of the job. In block P6' of FIG. 5, the CPU 20A routes the rotated digital image to the print head 28A which prints the rotated image on sheet medium 102A.

The present invention provides a digital transfer device 10, 10A capable of overcoming processing and memory size limits of device components in order to perform certain image transfer operations such as image shift or image rotation of very large images. Image transfer devices of the prior art generally have limited hardware and software resources, such as for example, limited processing and memory size, in order to reduce the cost of these devices. As a result of the constrain on resources, image transfer devices of the prior art may have performance limitations in regards to the sizes, and types of images which may be processed by the devices when performing certain image transfer operations. For example, image transfer devices of the prior art with an image rotation feature, may have limited processing and memory size which prevents rotation of images greater than a given size, or images which include certain types of graphics. When attempting to perform image rotation of these large images, the image transfer devices of the prior art merely cancel the operation. The present invention proposes a method and apparatus for processing large images when the user desires to rotate a large image that is larger than hardware capabilities of the device. The device 10, 10A may provide the user with three options: 1) cancel the job and reprogram, 2) crop images to fit, 3) reduce images to fit. Otherwise, the image transfer device 10A may allow an SA/KO to specifying the desired operation.

With option 1, the job is deleted and the system informs the user of the maximum input dimensions the system can rotate. The system displays a message indicating programming options (e.g. input edge erase, image shift) to alleviate the problem. For option 2, three variations may be possible. The system may center crop, head/foot crop, or side crop. With the center crop option, the system cuts out of the image an equivalent amount from each border sufficient enough to make the resultant image the maximum dimensions that can be rotated. With head/foot cropping, the top and bottom of the image may be cropped. For side cropping, the left and right side of the image is cropped, though in alternate embodiments the device 10 may allow the user to specify the which borders to crop. For option 3, the device 10, 10A reduces the image to the maximum size that can be rotated. Based on the settings, the reduction may be either isotropic, or anamorphic. With options 2, and 3, the device 10, 10A completes the job. An appropriate warning message may appear on the job's error sheet. The present invention enables the image transfer device 10, 10A, to complete complex rotation jobs that could not be performed with the devices of the prior art. The image transfer device 10, 10A, of the present invention, increases the range of image sizes the device 10, 10A can successfully process.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for transferring an image disposed on a medium with an image: transfer device, the method comprising the steps of:
   providing the image transfer device with a controller and a reader operably connected to the controller for reading the image on the medium;
   reading the image on the medium with the reader of the image transfer device; and
   in response to registering with the controller that the image on the medium is larger than a predetermined size, then forming with the controller a modified image from the image on the medium wherein the modified image is smaller than the predetermined size.

2. A method in accordance with claim 1, further comprising the step of rotating with the controller the modified image wherein when the modified image is transferred onto a different medium the: modified image on the different medium is rotated in comparison to an orientation of the image on the medium.

3. A method in accordance with claim 1, wherein the step of forming the modified image is performed automatically by the controller when the controller registers that the image on the medium is larger than the predetermined size.

4. A method in accordance with claim 1, wherein the step of forming the modified image comprises at least one of cropping the image, or reducing the image.

5. A method in accordance with claim 4, wherein cropping the image comprises at least one of cropping borders of the image, cropping the head and foot of the image, or cropping a side of the image.

6. A method in accordance with claim 4, wherein reducing the image comprises at least one of performing an isotropic reduction of the image, or performing an anamorphic reduction of the image.

7. A method in accordance with claim 1, wherein forming the modified image comprises sending an electronic embodiment of the image on the medium from the reader to the controller, and modifying the electronic embodiment to form the modified image, wherein the modified image is at least one of a cropped image or a reduced image.

8. A method in accordance with claim 1, further comprising the step of displaying a warning message with the controller on a display of the image transfer device, the controller displaying the warning message on the display in response to registering that the image on the medium is larger than the predetermined size.

9. A method for transferring an image on a medium with an image transfer device, the method comprising the steps of:
   providing the image transfer device with a controller, a reader operably connected to the controller for reading the image on the medium, and image transfer means operably connected to the controller for transferring the image to a different medium, the controller being programmed to operate the reader and image transfer means to perform a group of user selectable transfer operations;
   reading the image on the medium with the reader of the image transfer device;
   with the controller, determining if the image on the medium is larger than a predetermined size;
   if the size or the image on the medium is greater than the predetermined size, then forming with the controller a modified image of the image on the medium; and
   with the controller, sending the modified image to the image transfer means for transferring the modified image to the different medium;

wherein the step of determining if the image on the medium is larger than the predetermined size is performed by the controller in response to a user selecting a predetermined transfer operation from the group of transfer operations programmed in the controller.

10. A method in accordance with claim 9, wherein the step of forming the modified image is performed automatically by the controller of the image transfer device.

11. A method in accordance with claim 9, wherein the modified image is smaller than the predetermined size.

12. A method in accordance with claim 9, wherein forming the modified image comprises at least one of cropping the image, or reducing the image.

13. A method in accordance with claim 12, wherein cropping the image comprises at least one of cropping borders of the image, cropping the head and foot of the image, or cropping a side of the image, and wherein reducing the image comprises at least one of performing an isotropic reduction of the image, or performing an anamorphic reduction of the image.

14. A method in accordance with claim 9, wherein the predetermined image transfer operation comprises rotating the image.

15. A method in accordance with claim 9, further comprising the step of displaying a warning message with the controller on a display of the image transfer device, the controller displaying the warning message on the display if the size of the image on the medium is greater than the predetermined size.

16. An image transfer device for transferring an image disposed on a medium, the image transfer device comprising:
 a controller programmed to operate the image transfer device for performing a number of user selectable image transfer operations; and
 a reader operably connected to the controller for reading the image on the medium;
 wherein the controller is programmed for determining if the image on the medium is larger than a predetermined size, and for forming a modified image of the image on the medium if the image on the medium is larger than the predetermined size, and wherein the controller determines if the image on the medium is larger than the predetermined size in response to user selection of a predetermined image transfer operation from the number of user selectable image transfer operations.

17. An image transfer device in accordance with claim 16, wherein the modified image is smaller than the predetermined size.

18. An image transfer device in accordance with claim 16, wherein the controller has programming for automatically forming the modified image upon determining that the image on the medium is larger than that the predetermined size.

19. An image transfer device in accordance with claim 16, wherein the controller programming for forming the modified image comprises programming for at least one of cropping the image, or for reducing the image.

20. An image transfer device in accordance with claim 19, wherein the controller programming for cropping the image comprises at least one of programming for cropping borders of the image, programming for cropping the head and foot of the image, or programming for cropping a side of the image, and wherein the controller programming for reducing the image comprises at least one of programming for performing an isotropic reduction of the image, or programming for performing an anamorphic reduction of the image.

21. An image transfer device in accordance with claim 16, further comprising a display operably connected to the controller, wherein the controller displays a warning message on the display in response to determining that the image on the medium is larger than the predetermined image size.

22. An image transfer device in accordance with claim 16, wherein the predetermined image size is a maximum image size which can be rotated by the controller.

23. An image transfer device for transferring an image disposed on a medium, the image transfer device comprising:
 a controller programmed to operate the image transfer device for performing a number of user selectable image transfer operations; and
 a reader operably connected to the controller for reading the image on the medium;
 wherein the controller is programmed for registering a size of the image on the medium, and for comparing the size of the image with a predetermined image size in response to user selection of a predetermined image transfer operation, and wherein if the size of the image on the medium is larger than the predetermined image size the controller makes available for selection user selectable features including at least one of a feature for cropping the image, or a feature for reducing the image.

* * * * *